June 8, 1965   J. L. McCOLLOUGH ETAL   3,187,463
TRANSPLANTER CONTAINER
Filed March 11, 1963
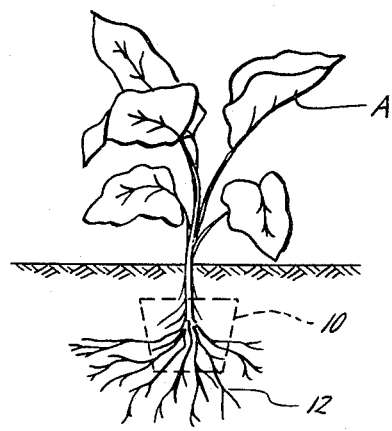
John L. McCollough
Robert E. Ferguson
INVENTORS
BY Vincent Martin
Jos E. Edwards
M. H. Gay
ATTORNEYS

United States Patent Office 3,187,463
Patented June 8, 1965

3,187,463
TRANSPLANTER CONTAINER
John L. McCollough, 421 Arizona St., and Robert E. Ferguson, 2807 Atkinson Drive, both of Lufkin, Tex.
Filed Mar. 11, 1963, Ser. No. 264,326
7 Claims. (Cl. 47—34)

This invention relates to new and useful improvements in transplanter containers.

In the seed and nursery industry, it is the practice to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period although some disadvantages, such as proper control of plant watering by reason of improper porosity of the container, are present. The major disadvantage, however, of the containers now in general use is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto.

It is, therefore, one object of this invention to provide an improved transplanter container which is constructed of a composition of materials capable of maintaining the shape of the container during the initial growth period of a plant but which allows the roots of the plant to grow therethrough, whereby when transplanting of said plant is desirable, the entire container and its contents may be transplanted to the field or to a larger container to eliminate the possibility of disturbing or damaging the root system.

An important object of the invention is to provide a transplanter container which consists of an improved composition of material having sufficient strength to contain the soil in which the seed or seedling is planted and having the property of allowing the root system to develop therein and therethrough and having the further characteristic of being capable of disintegration when planted in the field, together with the quality of acting as a soil conditioner, not only during initial growth but particularly after field planting and subsequent disintegration, whereby plant growth is encouraged and improved.

Another object is to provide an improved transplanter container constructed of a material having the property of holding its shape while in a moist condition and also having desired porosity which allows drainage of excess water to thereby assure improved plant growth; said material being such that the plant root system can prosper therein and upon subsequent disintegration following field planting, is capable of functioning as a soil conditioner.

A particular object is to provide a transplanter container which comprises a composition of material, the major portion of which is plant nutrient and soil conditioner, such as pine bark or cotton seed hulls or a combination of pine bark and cotton seed hulls; both pine bark and cotton seed hulls have plant nutrient and soil conditioner properties although pine bark has a more desirable drainage rate.

A further object is to provide a transplanter container constructed of a composition comprising, 60% to 85% pine bark or cotton seed hulls, or a combination of pine bark and cotton seed hulls, 15% to 40% of a fibrous material such as ground paper stock, a wetting agent which functions to soften the pine bark or hulls and increase its affinity for the fibrous material and also for a wet strength agent, a wet strength agent, and an acidity controlling agent which controls the pH of the composition; said composition having the required properties to permit it to be formed into a container for initial plant growth and to thereafter act as a soil conditioner following transplanting in the field.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is an isometric view of a small plant contained within a transplanter container constructed in accordance with this invention;

FIGURE 2 is a similar view, showing the plant after its initial growth period and illustrating the plant root system growing through the material of the container;

FIGURE 3 is a view, illustrating transplanting of the plant and including the container in a field; and FIGURE 4 is a view, illustrating transplanting within a larger container.

In the drawings, the numeral 10 designates a transplanter container constructed in accordance with the present invention. As will be explained, the composition of material of which the container is constructed provides a container which has the necessary strength to maintain its shape throughout the initial growing period of a plant A contained therein, has sufficient porosity to assure proper water drainage, and at the same time is capable of retaining enough moisture to provide the needed water for the small plant A therein. Also, the texture of the composition of which the container is constructed is such that the roots B of the plant may actually grow therethrough in the manner illustrated in FIGURE 2. The thickness of the wall 11 of the container is subject to variation but is made sufficiently thick so that the container will have the strength to maintain its contour and shape, not only during the initial growing period of the plant, but also during handling and subsequent transplanting.

In using the container, suitable soil, mulch or other material, indicated at 12 in the drawings, is placed within the container and the small plant A is planted therein; it might be that a seed may be planted within the container as distinguished from planting a small plant or seedling, but in any event, the initial growth period occurs while the plant is within said container.

As the plant A grows and prospers within the container, its root system B is developed and established within the material 12 and portions of the root system may grow into and ultimately entirely through the container wall; such growth is illustrated in FIGURE 2. Upon growth to the point shown in FIGURE 2, the plant is ready for transplating either in the field, as indicated in FIGURE 3, or into a larger container 13, as shown in FIGURE 4. Where a larger container is employed, it may be constructed of the same material as the container 10 unless no further transplanting is contemplated, in which case the larger container may be of any desired material.

Where the plant is transplanted into the field, as shown in FIGURE 3, it is merely necessary to make the transplanting without removing the material 12 and plant A from the container 10. The entire container and its plant are transplanted and the root system continues to grow and prosper in the soil. Upon planting of the container within the field, as shown in FIGURE 3, the composition of material of which the container is constructed is capable of disintegration and as it disintegrates, it functions as a soil conditioner or mulch which, as is well known, provides the proper environment conducive to continued healthy plant growth. Eventually, the container 10 will be completely dissolved in the soil but during such dissolution, will have conditioned the soil area surrounding the root system.

With a container having the foregoing characteristics and properties, a seed or seedling may be initially planted within the container and as the root system develops, said roots become embedded within said material and ultimately grow into and through the wall 11 of the container. Upon transplanting, the entire container plus the material 12 and plant A are transplanted as a unit and it is unnecessary to disturb the root system. In the case where the transplanting is into the soil in an outdoor field, as shown in FIGURE 3, the material of the new container 10 disintegrates and as it does so, it functions as a soil conditioner which assists in the continued growth of the plant A. It is, therefore, evident that since the root system need never be disturbed, an efficient transplanting which does not impede or impair plant growth is accomplished.

The transplanter container of this invention has certain characteristics which produce practical advantages over other prior containers of this type. Initially, the composition of material of which it is constructed must lend itself to be formed into the desired shape and size and it must have sufficient strength to retain such shape during the initial growing period or until the transplanting occurs; also, the composition must have sufficient porosity to permit water drainage to eliminate overwatering of the plant during the initial growing period and yet, at the same time, the composition must be capable of retaining enough moisture to supply the plant. After transplanting, the composition of material must have the characteristic of disintegrating and functioning as a soil conditioner. I have discovered that a composition of material consisting of the elements hereinafter set forth in detail provides all of the above required and necessary properties for improved transplanter containers.

The preferred composition of material is constructed of a plant nutrient-soil conditioner and a fibrous material which functions as a binder. Preferably, the composition consists primarily of pine bark and disintegrated paper stock. Pink bark has been found to have the desirable characteristics as a plant nutrient and soil conditioner and after molding has the required water drainage rates. However, cotton seed hulls, having substantially similar properties except for low water drainage rates, may be substituted. Actual experiments have shown that a combination of pine bark and cotton seed hulls in the proportion of four parts pine bark and one part cotton seed hulls will, when admixed with paper stock, form an excellent material for molding into transplanter containers. Cotton seed hulls contain desired nitrogen and for this reason are satisfactory but, as noted, hulls have slow drainage rate and a high point of saturation so that even though the hulls may be employed as the major element for combining with the paper stock, it is preferred that pine bark alone or pine bark combined with cotton seed hulls be used. The invention will be described, referring to pine bark as the major element of the composition. However, as above noted, the composition may include pine bark or in lieu thereof cotton seed hulls, or the composition may be a combination of both pine bark and cotton seed hulls.

The pine bark is ground to a fine texture which is preferably in the order of 12 mesh particle size. The fineness of the size is subject to some variation and is actually controlled by the consistency which is desirable in the mixture after it is mixed with the paper stock. For example, if the particle size is too large, the final mixture tends to be lumpy whereas if the particle size is too small, the mixture is extra fine and creates dust problems in handling.

The pine bark comprises the major element of the composition and is preferably in the percentage range of 65% to 85% of the total bulk. The remainder of the bulk material is paper stock and because of its availability and relatively cheap cost, newspaper stock has been found satisfactory. As is well known, newspaper stock consists of approximately 75% ground wood fibers and, if desired, such fibers could be employed; however, the greater expense and economics dictate the preference for newspaper stock. As will be explained, the paper stock functions as a binder to hold the particles of pine bark together and provide the necessary strength after molding. The percentage of paper stock can vary from 35% to 15% of the total bulk material depending upon the percentage of pine bark use; together the pine bark and paper stock may be said to form 100% of the bulk mixture.

Prior to admixture with the pine bark, the paper stock is pulped by wetting with water and is then beaten or agitated until it returns to substantially its original state of disintegrated fiber. It is then thoroughly admixed with the pine bark and sufficient water is added to form a slurry. Preferably, the mixture is diluted to .25% consistency, which consistency facilitates easy and accurate subsequent molding into desired product shape while retaining porosity, which has been found to be proper for efficient plant growth. By .25% consistency of the mixture is meant .0208 of a pound of stock or pulp to one gallon of water; this relationship creates a diluted mixture or slurry having a consistency which will permit the slurry to be properly formed into the selected shape of container. Depending upon the method of forming, the consistency may vary between the approximate range of .25% to 1%. The shape, of course, is subject to variation and although illustrated as a bowl shape in the drawings, can take any other form which might be desired.

Pine bark or cotton seed hulls have no natural affinity for wood fibrous material and the mixture of pine bark or a combination of pine bark and cotton seed hulls with disintegrated paper stock fiber, formed in a slurry as heretofore described, does not provide a composition which can be subsequently molded into a relatively permanent shape; also, since the final molded product must have proper wet strength, it is necessary that the mixture of pine bark and fibrous material must have an affinity for a suitable wet strength agent.

For imparting to the pine bark an affinity for the fibrous material and also for increasing the affinity of the mixture for a wet strength agent, a wetting agent is added to the mixture of pine bark and fibrous material. The wetting agent penetrates the pine bark to soften it to some degree and thereby imparts to it a sufficient affinity for the fibrous material to assure the subsequent production of a porous homogenous mass. The particular wetting agent is a detergent or surfactant (surface active agent) and is preferably a non-ionic detergent. One example of such a non-ionic detergent are the ethylene oxide condensates of amides and fatty acids. Several non-ionic detergents are available on the market, such as "Igepal 630," manufactured by Antara Division of General Aniline and Film Corporation of New York; Igepal 630 has been found satisfactory. Another commercial detergent having desired properties is "Sterox C.D.," manufactured by Monsanto Chemical Company. So long as the detergent is water soluble at room temperature and is capable of increasing the affinity of the pine bark for the fibrous material, excellent final results will be produced.

The wetting agent is preferably added to the pine bark-fibrous material mixture in an amount equal to approximately ¼%. By ¼%, as used herein, is meant 0.25 pound of wetting agent per 100 pounds of the mixture.

Although ¼% has been found to produce satisfactory results, the percentage may vary from ⅛% to ⅜% of wetting agent employed.

As noted, a wet strength agent is also added to the mixture and its function is to react with the elements of the mixure of pine bark and fibrous material to act as a bonding agent to bond the product together while giving it the necessary wet strength to retain its shape while in a moist condition. Thus, the wet strength agent performs the dual function of bonding the various elements of the mixture together and at the same time imparting a wet strength quality to the mixture.

Although various wet strength agents capable of bonding the product are available, it is preferable to employ a urea formaldehyde, such as "Kymene 660" or a polyamide, such as "Kymene 557," manufactured by Hercules Powder Company and availabe on the open market. The former is more acid than the latter and the selection is determined by soil condition requirements. Another comparable product available on the open market is "607 Parez," which is also a urea formaldehyde, manufactured by the American Cyanamid Company. The wet strength agent is preferably added to the mixture in the percentage of 1%; by this is meant 1 pound of wet strength agent is added to 100 pounds of the mixture of pine bark and paper stock. Although approximately 1% of the wet strength agent is preferable, the percentage may vary from ¾% to 1¼% and still produce satisfactory results.

To control the pH of the final slurry, a suitable pH control agent is added. It is desirable to control the pH from the neutral point (7.0) toward the acid side since this provides an environment more conducive to plant growth. Although various well-known pH control agents may be used, alum has been found particularly satisfactory because it is available in dry form which facilitates handling; also, the alum reacts with the wetting agent and the wet strength agent and functions to set such agents in the final product. Dilute sulphuric acid is also satisfactory for pH control. By controlling pH, proper drainage rate of the composition is also obtained. Actual practice has shown that it is preferable to use the alum in the percentage of ¼%, that is to say 0.25 pound of alum per 100 pounds of the mixture which controls the mixture to approximately 4.5 pH. However, this percentage may be varied between ⅛% to ⅜% depending upon the pH desired in the material of the final product.

From the foregoing, it will be seen that the new composition of material comprises a mixture which is diluted to a desired consistency to form a slurry and which consists basically of pine bark and paper stock. A wetting agent which reacts with the pine bark is added, as well as a wet strength agent which will provide the necessary strength to maintain the shape of the product even though it be in a moist or wet condition. Additionally, the pH of the mixture is controlled to assure acidity which has a direct relationship to the drainage rate of the final mixture as well as a direct bearing on the environment in which the plant is growing.

It may be desired to impart a color to the composition and, if so, any well known coloring agent may be added. For example, basic brown pigment which is in widespread use in forming kraft paper may be employed.

The product may be formed in any desired way as by molding. Since it is a slurry having a predetermined consistency, it may be formed on an apparatus employing movable molds which pass through the slurry in the manner illustrated in the prior patent to Chaplin, No. 1,845,830. In such case, a vacuum may be used to draw the slurry into the mold and the thickness of the wall of the container is primarily controlled by the consistency of the slurry in relationship to the speed of movement of the mold through the slurry plus the particular inches of vacuum employed; obviously, the heavier the consistency, the thicker the wall will be if the mold moves at a relatively slow rate through the slurry. If the movement of the mold through the slurry is increased or if the slurry consistency is lightened, a thinner walled container would be produced. Of course, as noted, the molding machine shown in Chaplin is merely one manner of forming the container and, obviously, said container may be formed in any one of a number of the presently well-known methods which are familiar to those skilled in the art.

A transplanter container constructed of the composition of material above described has all of the necessary characteristics and properties which are desirable in initially growing small plants or seedlings and then subsequently transplanting them to different environments. The material has sufficient wet strength property to maintain its shape while moist enough to supply the plant with moisture during the initial growing period and yet the material has the necessary porosity for water drainage so that the small plant is not over-watered. Upon transplanting, the strength of the material is sufficient so that the container and plant may be handled and transplanted as a complete unit so that there is no disturbance or damage to the root system of said plant. Upon planting in the usual soil in the field, the pine bark and paper stock have the characteristics of gradually disintegrating and the pine bark, upon integration, functions as a soil conditioner which assures that the plant will continue to prosper and grow and will not be impeded by the transplanting operation.

Although the particular percentages which have been found to be preferable are set forth above, it is evident that these percentages may vary within reasonable limits. So long as the bulk of the mixture is formed by pine bark (or cotton seed hulls or a combination of bark and hulls) and paper stock and is combined with a suitable wetting agent, a wet strength agent and a pH controlling agent, the purposes of this invention will be accomplished.

The particular chemicals which have been identified above as being combined with the mixture have been found to properly bond the pine bark and fibrous material (disintegrated paper stock) together so that a transplanter container having the necessary strength while in a moist condition, which is necessary for initial plant growth, is produced. Although it has been generally known that pine bark is an excellent soil conditioner, difficulty has been experienced in the past in using this material in transplanter containers because the proper chemicals for bonding of the final mixture and for imparting to it the necessary characteristics have not been known. After the container has been transplanted into the soil, without any disturbance of the root system, the pine bark or its substantial equivalent of cotton seed hulls or a combination of pine bark and cotton seed hulls, functions as an excellent soil conditioner to assure efficient continued plant growth.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:

1. A composite molded product comprising an admixture of fine texture pine bark in the percentage of between 78% to 80% of total bulk, pulped paper stock in the percentage of between 19% to 21% of total bulk, a non-ionic detergent in the percentage of between ⅛% to ⅜% in pounds of the total bulk mixture, alum in the percentage of ⅛% to ⅜% in pounds of the total bulk mixture and urea formaldehyde in the percentage of ¾% to 1¼% in pounds of the total bulk mixture.

2. A molded composite product as set forth in claim 1 which is in the physical form of a transplanter container.

3. A transplanter pot molded from an admixture of ground pine bark and ground cotton seed hulls, said mixture comprising an overall percentage in composition between the range of 78% to 80% of total bulk,
pulped paper stock in the percentage of between 19% to 21% of total bulk,
a non-ionic detergent in the percentage of 1/8% to 3/8% in pounds of the total bulk of the admixture,
alum in the percentage of 1/8% to 3/8% in pounds of the total bulk of the admixture, and
urea formaldehyde in the precentage of 3/4% to 1 1/4% in pounds of the total bulk mixture.

4. A composite molded product comprising an admixture of
a plant nutrient-soil conditioner selected from a class consisting of ground pine bark and ground cotton seed hulls in the percentage of between 78% to 80% total bulk,
pulped paper stock in the percentage of between 19% to 21% of total bulk,
a non-ionic detergent in the percentage of between 1/8% to 3/8% in pounds of the total bulk mixture,
alum in the percentage of 1/8% to 3/8% in pounds of the total bulk mixture and
a wet strength agent in the percentage of 3/4% to 1 1/4% in pounds of the total bulk mixture.

5. A composite molded product comprising an admixture of
fine texture pine bark in the percentage of between 78% to 80% of total bulk,
pulped paper stock in the percentage of between 19% to 21% of total bulk,
a non-ionic detergent in the percentage of between 1/8% to 3/8% in pounds of the total bulk mixture,
alum in the percentage of 1/8% to 3/8% in pounds of the total bulk mixture and
a wet strength agent in the percentage of 3/4% to 1 1/4% in pounds of the total bulk mixture.

6. A composite molded product comprising an admixture of
ground cotton seed hulls in the percentage of between 78% to 80% of total bulk,
pulped paper stock in the percentage of between 19% to 21% of total bulk,
a non-ionic detergent in the percentage of between 1/8% to 3/8% in pounds of the total bulk mixture,
alum in the percentage of 1/8% to 3/8% in pounds of the total bulk mixture and
urea formaldehyde in the percentage of 3/4% to 1 1/4% in pounds of the total bulk mixture.

7. A composite molded product comprising an admixture of
fine texture pine bark constituting between 60% to 85% of total bulk,
a wood fibrous material constituting 15% to 40% of total bulk,
a non-ionic detergent in the percentage of between 1/8% to 3/8% in pounds of the total bulk mixture,
a pH controlling element in the percentage of 1/8% to 3/8% in pounds of the total bulk mixture and
a wet strength agent in the percentage of 3/4% to 1 1/4% in pounds of the total bulk mixture.

References Cited by the Examiner

UNITED STATES PATENTS

| | | | |
|---|---|---|---|
| 1,776,016 | 9/30 | Alvord | 47—37.5 |
| 1,944,788 | 1/34 | Genz | 71—23 |
| 2,092,100 | 9/37 | Waynick | 71—23 |
| 2,706,155 | 4/55 | Yundt | 162—141 |
| 3,102,364 | 9/63 | Pullen | 47—37 |

FOREIGN PATENTS 586,226  11/59  Canada.

ABRAHAM G. STONE, *Primary Examiner.*